United States Patent [19]
Hoffman et al.

[11] Patent Number: 5,374,917
[45] Date of Patent: Dec. 20, 1994

[54] COMPUTERIZED MONITORING SYSTEM HAVING A PROGRAMMABLE GAUGE

[75] Inventors: John P. Hoffman, Peoria; Ricky D. Vance, Washington; Dennis A. Barney, Morton; Joseph G. Kozlevcar, Peoria, all of Ill.

[73] Assignee: Caterpillar Inc., Peoria, Ill.

[21] Appl. No.: 150,753

[22] Filed: Nov. 12, 1993

Related U.S. Application Data

[63] Continuation of Ser. No. 945,470, Sep. 16, 1992, abandoned.

[51] Int. Cl.$^5$ .............................................. B60Q 1/00
[52] U.S. Cl. ................................ 340/438; 340/459; 340/461; 340/517; 340/525
[58] Field of Search ............... 340/438, 439, 459–462, 340/517, 525, 691, 692

[56] References Cited

U.S. PATENT DOCUMENTS

| | | | |
|---|---|---|---|
| 3,516,063 | 6/1970 | Arkin et al. ........................... | 340/505 |
| 3,866,166 | 2/1975 | Kerscher, III et al. ........... | 340/52 F |
| 3,964,302 | 6/1976 | Gordon et al. ..................... | 73/117.3 |
| 4,197,650 | 4/1980 | Bailey et al. ........................ | 33/143 |
| 4,223,302 | 9/1980 | Hocking ............................... | 340/525 |
| 4,442,424 | 4/1984 | Shirasaki et al. ................... | 340/52 F |
| 4,551,801 | 11/1985 | Sokol ..................................... | 364/424 |
| 4,812,744 | 3/1989 | Havel .................................... | 324/115 |
| 4,815,824 | 3/1989 | Sharples .............................. | 350/336 |
| 4,862,395 | 8/1989 | Fey et al. .............................. | 364/561 |
| 4,926,331 | 5/1990 | Windle et al. ....................... | 364/424.04 |
| 4,967,143 | 10/1990 | Raviglione et al. ............... | 324/73.1 |
| 4,975,848 | 12/1990 | Abe et al. ............................. | 364/424.03 |
| 4,977,389 | 12/1990 | Shiraishi .............................. | 340/461 |

FOREIGN PATENT DOCUMENTS

| | | |
|---|---|---|
| 3837592A1 | 5/1990 | Germany . |
| 60-107109 | 12/1985 | Japan . |
| WO92/04693 | 3/1992 | WIPO . |

OTHER PUBLICATIONS

Caterpillar Service Manual–Computerized Monitoring System With LCD Bargraph Gauges–dated Nov. 1991.
Journal Article believed to have been published on or about Jan. 1990, entitled "All On Board With O & K" and sales literature attached thereto.
Caterpillar Service Manual–"Systems Operation Testing and Adjusting–Computerized Monitoring System with Liquid Crystal Display" published on or about Oct. 1990.

*Primary Examiner*—Donnie L. Crosland
*Attorney, Agent, or Firm*—Steven R. Janda

[57] ABSTRACT

Instruments are often designed to operate in connection with a variety of machine types. Advantageously, such gauges are sufficiently flexible to indicate the levels of parameters in either a high warning or a low warning format. In the subject invention, a gauge includes a plurality of indicating segments being selectively illuminable for indicating the levels of the sensed parameter in the normal operating range, a high warning segment being selectively illuminable for indicating the level of the sensed parameter being above the normal operating range, and a low warning segment being selectively illuminable for indicating the level of the sensed parameter being below the normal operating range. An identification code is produced and received by an instrument which responsively enables one of the high and low warning segments.

11 Claims, 6 Drawing Sheets

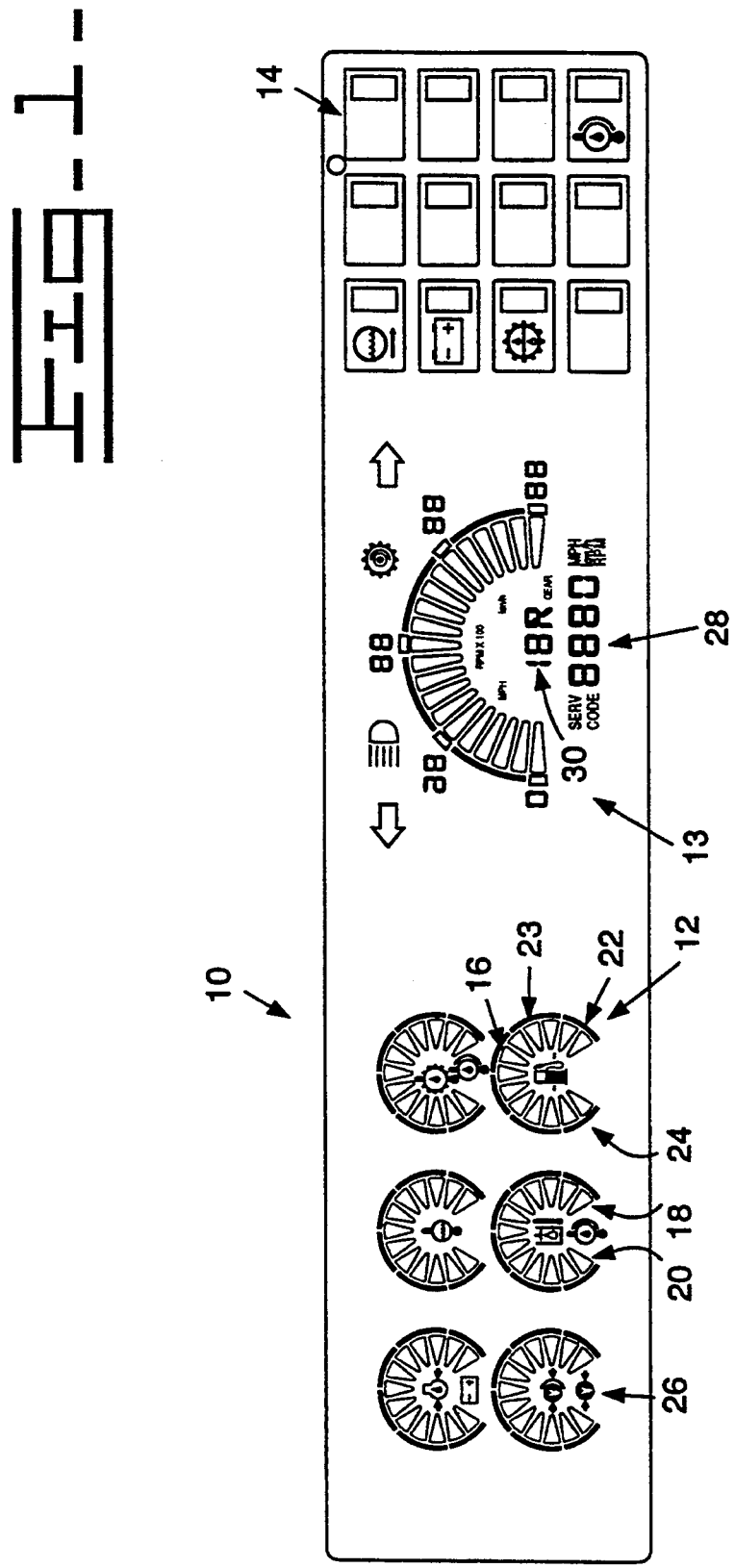

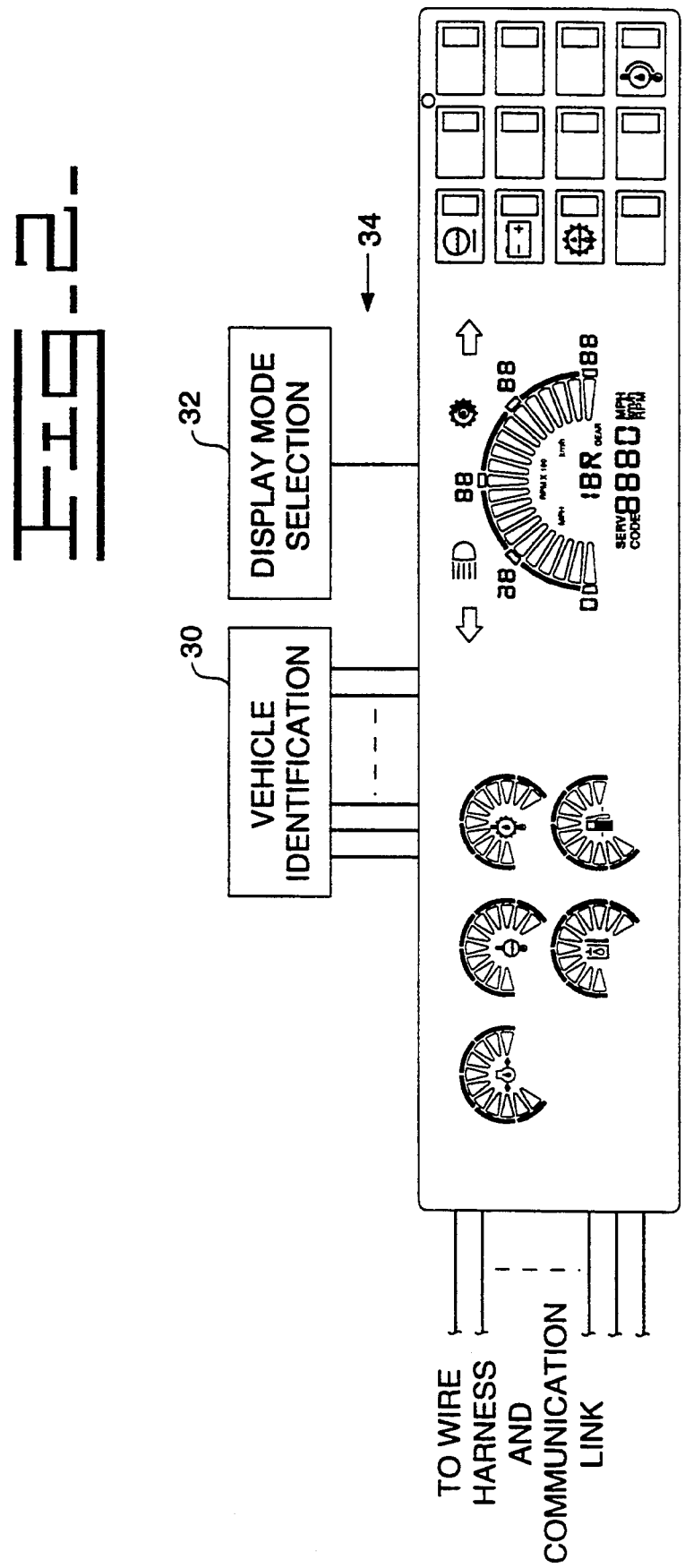

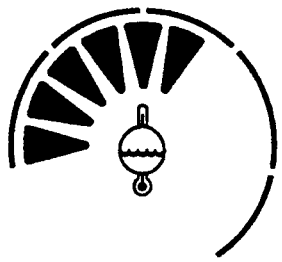
Fig._3a_
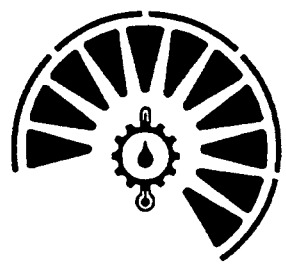
Fig._3b_
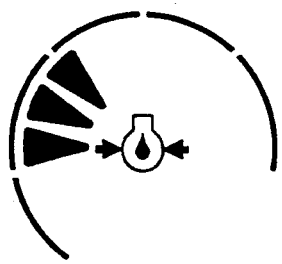
Fig._3c_
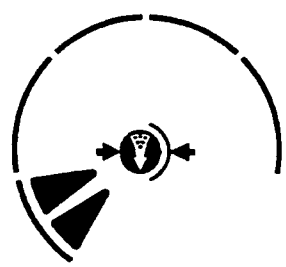
Fig._3d_
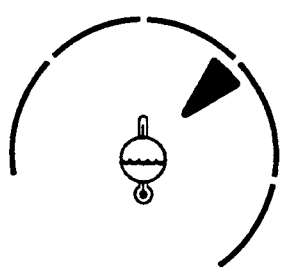
Fig._3e_

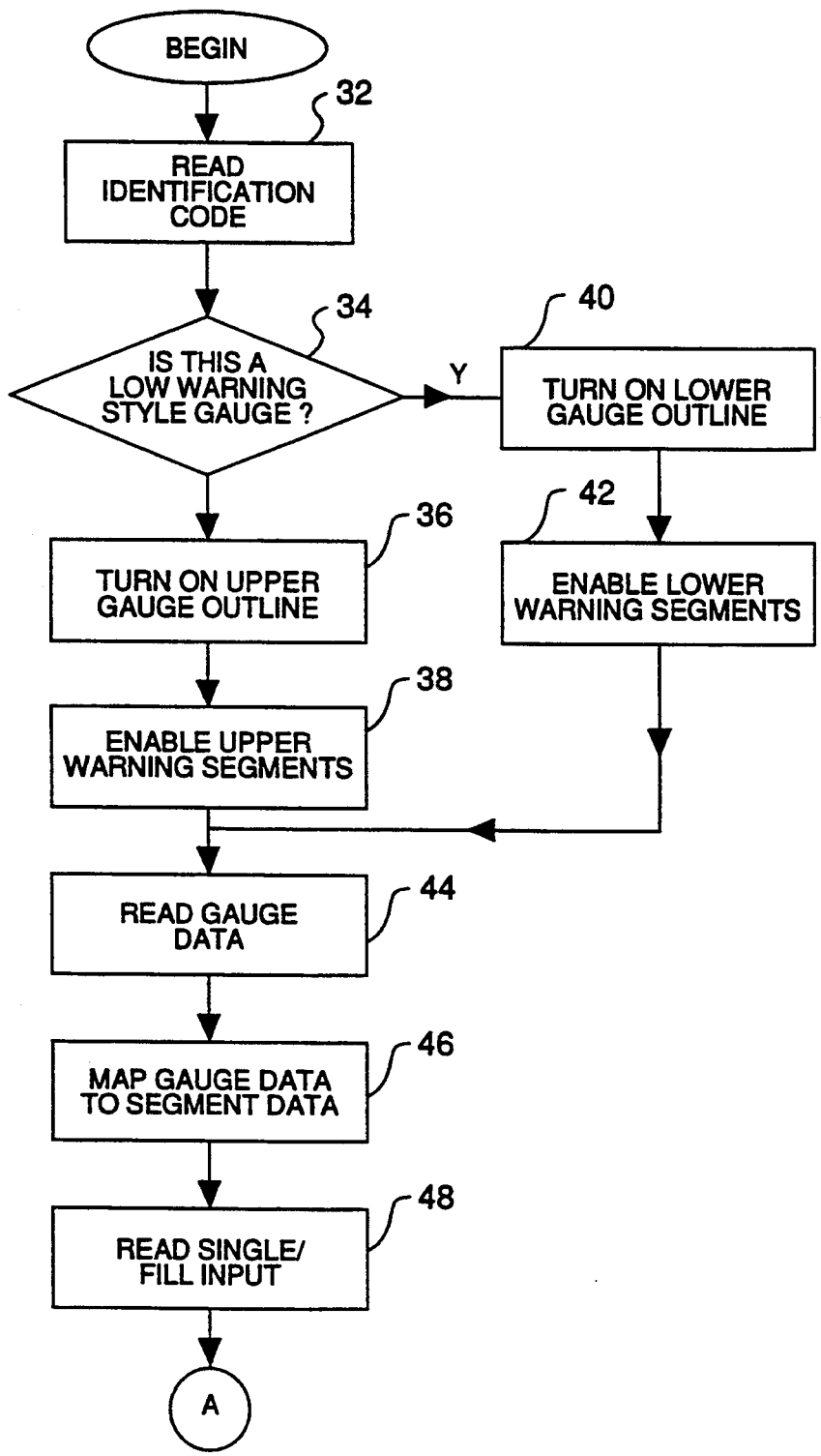
Fig_4a_

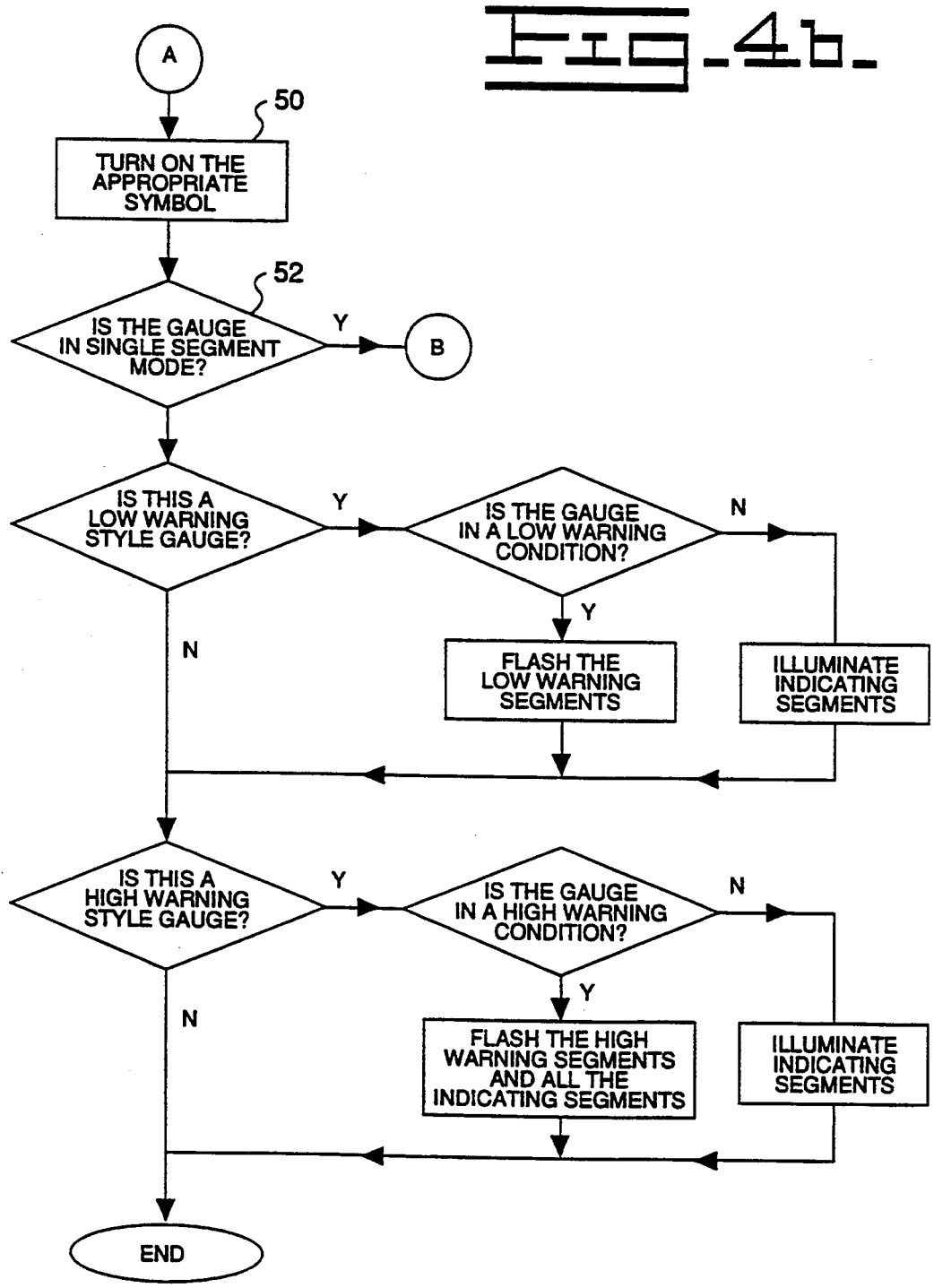

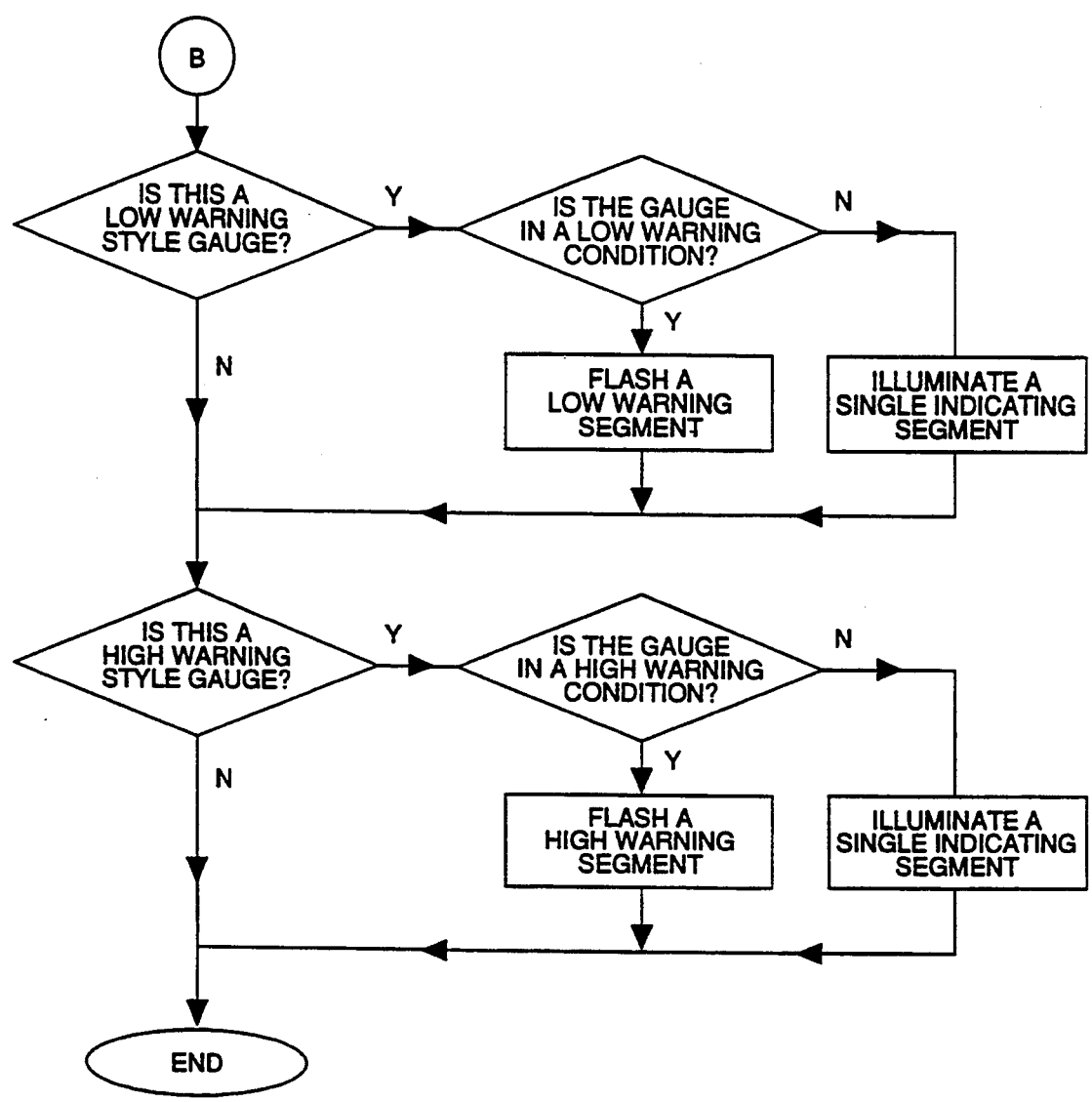
Fig_4c_

COMPUTERIZED MONITORING SYSTEM HAVING A PROGRAMMABLE GAUGE

This is a continuation of application Ser. No. 07/945,470, filed Sep. 16, 1992, now abandoned.

DESCRIPTION

1. Technical Field

The invention relates generally to displaying the level of a sensed parameter on a machine and, more particularly, to a method and apparatus for selectively altering the format of a gauge in response to being connected to one of a plurality of machines.

2. Background Art

In a variety of engine-powered vehicles, monitoring and diagnostic devices are employed to detect the presence of various undesirable operating conditions, such as overheating of the engine, low oil pressure, low fuel, and the like, and indicators are provided to warn the operator of such conditions. These instruments are typically connected to various sensors and switches for monitoring or controlling conditions on the vehicle via a wire harness and/or a communication link. In many applications, these instruments are also connected to electronic control systems, for example electronic engine controls, electronic transmission controls, and the like.

Most prior art systems have included dedicated instruments in which the functions and conditions of the vehicle to be monitored or diagnosed, as well as the particular sensors provided on the vehicle, are identified in advance. Therefore, the instruments are specifically designed for and hence "dedicated" to the monitoring or diagnosing of those particular vehicle functions and conditions in response to signals from pre-identified sensors. Accordingly, such "dedicated" instruments generally cannot be readily modified to accommodate different machines, different sensors and/or different conditions and functions. Rather, such instruments are generally limited to use with a particular vehicle type or model for which the instrument has been designed.

However, it is advantageous for these instruments to be usable in connection with many different machines. Lower costs will be achieved and less warehousing space will be required if a single instrument can be manufactured which can be used in many different applications. Similarly, service time is reduced if software changes are avoided when an instrument is moved from one machine to another.

Some prior art systems have provided for standardized monitoring systems that are usable in connection with a variety of machines, for example the system shown in U.S. Pat. No. 4,551,801 issued to Sokol on Nov. 5, 1985. While being an improvement over dedicated systems, this monitoring system is still relatively inflexible and requires the addition or subtraction of monitoring modules and the use of decals to indicate the parameters being shown by each display module.

An additional area of desired flexibility is for each gauge in the instrument to be capable of indicating parameters having a high warning level, for example engine temperature, and also parameters having a low warning level, for example brake fluid pressure. Prior art systems required the use of decals to indicate that the gauge was indicating the level of a parameter having either a high or low warning level and/or the use of a separate warning light to show that the parameter was outside the normal operating range.

It is also advantageous to provide machine designers with alternative display modes from which to select for use in connection with each machine. For example, when gauges having a plurality of illuminable segments are used on a machine, in connection with some machines the parameter level is displayed in a fill-the-graph mode in which a number of segments are illuminated similar to a bar graph, while in connection with other machines the parameter level is displayed in a single-bar mode in which only a single segment is displayed to simulate a mechanical gauge. Since different machine designers may prefer the fill-the-graph mode while others prefer the single-bar mode, it is desirable to provide the option of using either display mode.

The present invention is directed to overcoming one or more of the problems set forth above.

DISCLOSURE OF THE INVENTION

The invention avoids the disadvantages of known monitoring systems and provides a flexible system usable in connection with a variety of machines.

In one aspect of the invention, an apparatus is provided for indicating the level of one of a plurality of sensed parameters on one of a plurality of machines. An identification device produces an identification code. A plurality of indicating segments are selectively illuminable for indicating the levels of the sensed parameter in the normal operating range. A high warning segment is selectively illuminable for indicating the level of the sensed parameter being above the normal operating range. A low warning segment is selectively illuminable for indicating the level of the sensed parameter being below the normal operating range. One of the high and low warning segments are enabled in response to the identification code.

In another aspect of the invention, a method for indicating the level of one of a plurality of sensed parameters on one of a plurality of machines is provided. The method includes the steps of producing an identification code and responsively enabling one of a high warning segment for indicating the level of the sensed parameter being above the normal operating range and a low warning segment for indicating the level of the sensed parameter being below the normal operating range.

The invention also includes other features and advantages which will become apparent from a more detailed study of the drawings and specification.

BRIEF DESCRIPTION OF THE DRAWINGS

For a better understanding of the present invention, reference may be made to the accompanying drawings in which:

FIG. 1 is an illustration of a computerized diagnostic and monitoring system;

FIG. 2 is an illustration of a computerized diagnostic and monitoring system having a plurality of inputs used in connection with a preferred embodiment of the invention;

FIGS. 3a and 3b illustrate gauges indicating the level of parameters having a high warning value in the fill-the-graph mode;

FIGS. 3c and 3d illustrate gauges indicating the level of parameters having a low warning level in the fill-the-graph mode;

FIG. 3e illustrates a gauge indicating the level of a parameter having a high warning level in the single-bar mode; and FIGS. 4a, 4b, and 4c illustrate a flow chart of an algorithm used in connection with a preferred embodiment of the invention.

BEST MODE FOR CARRYING OUT THE INVENTION

An instrument for displaying parameter values is shown generally by the reference numeral 10 in FIG. 1. In the preferred embodiment, the instrument 10 is a computerized diagnostic and monitoring system for monitoring and displaying parameters and informing an operator by visible and/or audible indications when a warning condition exists. The instrument 10 includes a plurality of indicator lights 14, preferably LEDs, and a plurality of electronic gauges 12 having a plurality of illuminable segments, preferably of the vacuum fluorescent (VF) type. The gauges 12 preferably indicate the level of a plurality of sensed parameters, for example, ground speed, engine RPM, oil temperature, fuel level, transmission oil temperature, and the like, and may be used in connection with any of a plurality of different machine types. In the preferred embodiment, one of the gauges 12 is a speedo/tacho gauge 13 that displays either the speed of the vehicle or the RPM of the engine or transmission and includes numerical indicators for displaying the magnitude of the sensed parameter at various points along the speedo/tacho gauge 13. Warning conditions are brought to an operator's attention by the indicator lights 14, a flashing gauge, a flashing alarm lamp, and/or a horn. Advantageously, the indicator lights 14 are lit in response to switch-type inputs being in a fault or warning condition. The instrument 10 also advantageously includes displays for indicating such things as turn signal operation, hi-beam light operation, and transmission gear. The instrument 10 is advantageously microprocessor based and functions in response to internal software.

The instrument 10 illustrated in FIG. 1 is sufficiently flexible to be used in connection with a number of different machines and to indicate a number of different parameters. For example, each gauge, except the central gauge indicating speedo/tacho information, is capable of indicating either a high warning condition or a low warning condition.

Each of the gauges 12 other than the speedo/tacho gauge 13 includes a plurality of indicating segments 16, high warning segments 18, and low warning segments 20. However, only a single high or low warning segment 18,20 may be used. The high warning segments 18 are advantageously located in the most clockwise position on the gauge 12 and the low warning segments are located in the most counterclockwise position on the gauge 12. When it is desirable to indicate the level of a parameter for which it is advantageous to indicate a warning when the parameter exceeds a certain level, for example engine temperature, the high warning segments 18 are enabled. To indicate the level of parameter for which it is advantageous to indicate a warning when the parameter is below a certain level, for example fuel level, the low warning segments 20 are enabled. In some cases, it is advantageous to indicate both high and low warning conditions.

Advantageously, the gauges 12 also include a high outline segment 22, central outline segments 23, and a low outline segment 24, all of which being located around the periphery of each gauge and being illuminable. The high outline segment 22 is located adjacent the high warning segments 18 and the low outline segment 24 is located adjacent the low warning segments 20. The central outline segments 23 are located between the high and low outline segments 22,24. The central outline segments 23 are illuminated in response to the gauge 12 being used to indicate the level of a sensed parameter. In response to a parameter having a high warning value being indicated, the high outline segment 22 is illuminated; and in response to a parameter having a low warning value being indicated, the low outline segment 20 is illuminated. Thus, the appearance of the gauge 12 indicates that the displayed parameter has either a high or low warning level and better informs the operator that the level of the sensed parameter is approaching a warning level.

In the preferred embodiment, the high and low warning segments 18,20 are colored differently than the indicating segments 16; and the high and low outline segments 22,24 are colored differently from the central outline segments 23 and similarly to the high and low warning segments 18,20. Advantageously, the high and low warning segments 18,20 and high and low outline segments 22,24 are red and the indicating segments 16 and central outline segments 23 are blue-green. However, the low warning segments 20 and low outline segment 24 for the gauge 12 indicating fuel level are preferably yellow.

One or more of the gauges include a plurality of illuminable symbols 26 to identify the parameter being indicated. The symbols 26 are advantageously selected from the symbols approved by ISO for indicating the parameters of interest. One of the symbols 26 is illuminated in connection with each gauge 12 so that the operator can identify the indicated parameter. Thus, the gauge 12 is capable of indicating the level of one of two or more different parameters by illuminating one of the symbols 26. The parameter, and hence symbol 26, selected for each gauge 12 depends on the vehicle to which the instrument 10 is connected and choices made by the vehicle and system designers.

A digital display 28 is included to indicate either speedometer or tachometer information in digital form. In the preferred embodiment, one of the speedo/tacho gauge 13 and digital display 28 indicates speedometer information while the other indicates tachometer information; however, either speedometer or tachometer information may be indicated on both if so desired. Advantageously, the digital display 28 is also adapted to indicate the level of other parameters when the instrument 10 is operating in a numeric readout mode or diagnostic information when the instrument 10 is operating in diagnostic modes.

The gauges 12 are capable of displaying the parameter values in a plurality of display modes, including a single-bar mode and a fill-the-graph mode. In the single-bar mode, only one of the indicating segments 16 is illuminated when the level of the sensed parameter is within the normal operating range. Thus, the appearance of the gauge 12 simulates the appearance of a mechanical gauge. In the fill-the-graph mode, the level of the sensed parameter is indicated by illuminating a plurality of indicating segments 16 such that the appearance of the gauge 12 simulates a bar graph.

As shown in FIG. 2, the instrument 10 selects a group of gauges and a display format for each parameter to be indicated on the machine type of interest. Advantageously, each machine type has an identification code to be delivered to the instrument which responsively reconfigures itself in response to the layout chosen by the designer for that machine. In response to the identification code, the instrument determines the parameter monitored at each input from the wire harness, the parameter that is displayed on each gauge, the status report level for each input, the gauges to be used, the signal filtering, debounce, scaling, or averaging characteristics associated with each input, and the functional relationship between each parameter value and the gauge reading. One of the symbols 26 is illuminated for each gauge 12 in response to the identification code. Likewise, the switch-type input associated with each indicator light 14 is defined for each machine type on which the instrument 10 is used in response to the identification code.

An identification means 30 produces the identification code and a display mode select means 32 produces a display mode identifier. In the preferred embodiment, the identification means 30 and display mode select means 32 are connected to the instrument 10 via one or more identification lines 34 forming part of the wire harness and carrying the identification code and the display mode identifier.

In the preferred embodiment, the identification code and display mode identifier are in the form of binary signals that are produced by connecting each of the identification lines 34 to a ground input potential or allowing the voltage of the identification line to float in response to any voltage to which the identification line 34 is connected. In the preferred embodiment, the identification means 30 and display mode select means 32 directly connect the identification lines 34 to a terminal having one of the above described voltage characteristics; however, it should be appreciated that the identification lines 34 could be connected to a switch-type device for connection to a ground input potential or a floating terminal. While the preferred embodiment of the invention is described in connection with a ground input potential and a floating condition, it should be appreciated that the particular states of the binary signals could be modified without deviating from the spirit of the invention.

The instrument 10 is connected to each of a plurality of sensors by wire. When used in connection with some machine types, the instrument 10 may also be connected to one or more electronic controls via a communication link. In the preferred embodiment, the communication link is a two-way serial communication link on which the instrument 10 can both transmit and receive information. In the preferred embodiment, the instrument 10 builds a serial data series including a module identifier corresponding to the electronic control to receive the data, an identifier for each scaled parameter to be transmitted over the communication link, the scaled data representing the level of the parameter associated with each identifier, and the status of each switch-type input. Once the message is built, the instrument 10 transmits the message over the communication link.

Referring now to FIGS. 3a–3e, the operation of the gauges 12 is described. As shown in FIGS. 3a and 3b, when it is desirable to indicate the level of a parameter for which it is advantageous to indicate a warning when the parameter exceeds a certain level, for example hydraulic oil temperature, on one of the gauges 12 in the fill-the-graph mode, the high warning segments 20 are enabled, the high outline segment 22 is illuminated, and the indicating segments 16 are progressively illuminated in the clockwise direction as the sensed parameter increases from a low level to a maximum warning level. FIG. 3a illustrates a parameter for which it is desirable to indicate a high warning condition and being within the normal operating range.

As shown in FIGS. 3c and 3d, a parameter for which it is advantageous to indicate a warning when the parameter is below a certain level, for example fuel level, is indicated in the fill-the-graph mode by enabling the low warning segments 18 and illuminating the low outline segment 24. The indicating segments 16 are illuminated to indicate the sensed parameter being at a high level and progressively turned off in the counter-clockwise direction as the level of the sensed parameter decreases. FIG. 3c illustrates a parameter for which it is desirable to indicate a low warning condition and being within the normal operating range.

FIG. 3e illustrates a gauge 12 in the single-bar mode indicating the level of a sensed parameter for which it is desirable to indicate a warning when the parameter exceeds a certain level. The level of the sensed parameter is within the normal operating range. The indication of a parameter for which it is desirable to indicate a low warning condition in the single-bar mode would look similar to the gauge shown in FIG. 3e except the low outline segment 24 would be illuminated instead of the high outline segment 22.

For each parameter level being displayed on the gauge 12, a high or a low warning value is established as described below. The behavior of the gauge 12 in the fill-the-graph mode when the sensed parameter is above or below the high or low warning value, respectively, is best described in connection with FIGS. 3b and 3d.

For parameters having a high warning value, once the level of the sensed parameter exceeds the high warning value, all of the indicating segments 16, the central and high outline segments 22,23, the symbol 26, and one of the high warning segments 18 are caused to flash. As the level of the sensed parameter increases even farther, the second of the high warning segments 18 is also caused to flash. As shown in FIG. 3b, the sensed parameter has increased to a level at which all of the indicating segments 16, the symbol 26, the central and high outline segments 22,23, and both of the high warning segments 18 are all caused to flash.

With respect to a parameter having a low warning value, once the level of the sensed parameter decreases below the low warning value, the central and low outline segments 23,24, the symbol 26, and one of the low warning segments 20 are caused to flash. As the level of the sensed parameter decreases even farther, the second of the low warning segments 20 is also caused to flash. As shown in FIG. 3d, the sensed parameter has decreased to a level at which the central and low outline segments 23,24, the symbol 26, and both of the low warning segments 20 are all caused to flash.

The display of a sensed parameter in the single-bar mode when the level of the sensed parameter is above the high warning value includes the flashing of the central and high outline segments 22,23, the symbol 26, and one of the high indicating segments 18. Similarly, the display of a sensed parameter being below the low warning value in the single-bar mode includes the flashing of the central and low outline segments 23,24, the symbol 26, and one of the low indicating segments 20. Which of the two high or low indicating segments 18,20 to be flashed is determined in response to the degree to which the level of the sensed parameter is above or below the high or low warning values, respectively.

In addition to the above warning indications, the warning horn or the alarm lamp may be activated when the level of the sensed parameter exceeded the high or low warning value.

A gear display 30 is advantageously disposed adjacent the digital display 28. The gear display 30 indicates the number and direction, i.e. forward, neutral, or reverse, of the vehicle transmission.

The indicator lights 14 indicate various system faults or warning conditions. In the preferred embodiment, one or more of the indicator lights 14 are associated with warning conditions of parameters indicated by the gauges 12.

The instrument 10 preferably performs some processing of signals received from the sensors over the wire harness and scales the signals received from pulse-width modulated type sensors and frequency based sensors in manners well-known in the art.

Similarly, the instrument 10 receives signals from the switch-type sensors, the gauge select means 24, and the data select means 28. The signals associated with these inputs are received by the instrument 10, but generally no scaling is required.

In the preferred embodiment, the instrument 10 executes the algorithm illustrated in FIGS. 4a–c. The instrument 10 reads 32 the identification code from the identification means 30 and, for each of the gauges other than the speedo/tacho gauge 13, determines 34 whether the gauge is a high or low warning style gauge. Advantageously, this is determined by retrieving a gauge style identifier from a memory device (not shown) within the instrument 12 for each gauge to be used. The gauge style identifier is retrieved from the memory device in response to the identification code. Each of the gauge style identifiers are selected in response to choices made by the vehicle designers regarding which parameters are to be displayed and the preferred display format for each parameter.

If the gauge is a low warning style gauge, the low outline segment 24 is illuminated 40 and the low warning segments 20 are enabled 42. If the gauge is a high warning style gauge, the high outline segment 22 is illuminated 40 and the high warning segments 18 are enabled 42.

The instrument 10 reads 44 the sensor signals from the wire harness. Since the sensor signals may be in the form of pulse-width modulated signals, frequency signals, or switch-type binary signals, the instrument 10 converts and scales the inputs to a microprocessor readable form in manners well-known in the art. For example, if the output from one of the pulse-width modulated sensors Is sensing oil pressure and has a duty cycle of 70% and the range of the scaled signal is from 0–255, the binary number 179 is assigned to the oil pressure parameter.

In response to the scaled signal from the pulse-width modulated and frequency sensors, the instrument 10 determines which segments are to be illuminated on each gauge. In the preferred embodiment, the memory device (not shown) includes a plurality of stored parameter values corresponding to each possible magnitude of the scaled data for each sensed parameter in a look-up table of a type well-known in the art. The memory device (not shown) also includes a plurality of segment numbers included in a look-up table to indicate the number of segments to be illuminated in response to each of the stored parameter values. The instrument 10 thus maps 46 the scaled data to the parameter value which is in turn mapped to the number of segments to be illuminated on the associated gauge. Alternatively, an equation could be developed defining the relationship between the parameter values and the segment commands and could be solved in place of the use of the look-up table. Similarly, the scaled data could be mapped directly to the segment numbers.

In the preferred embodiment, the high and low warning segments 18,20 and indicating segments 16 are numbered, starting with the most counter-clockwise positioned segment and progressing in the clockwise direction, from 0 through 12. Provided that the sensed parameter is not below the low warning value, neither of the low indicating segments 20 is illuminated. Thus, if the number 7 is retrieved as the number of segments to indicate in the fill-the graph mode, then segments 2 through 7 are illuminated as shown in FIG. 3a. If the number 12 is retrieved as the number of segments to indicate in the fill-the-graph mode and the gauge is a high warning style gauge, then segments 2 through 12 are caused to flash as shown in FIG. 3b. If the number 4 is retrieved as the number of segments to indicate in the fill the graph mode and the gauge is a low style warning gauge, then segments 2 through 4 are illuminated as shown in FIG. 3c. If the number 0 is retrieved as the number of segments to indicate in the fill-the-graph mode and the gauge is a low style warning gauge, then segments 0 and 1 are caused to flash as shown in FIG. 3d. If the gauge is in the single-bar mode, then the segment corresponding to the retrieved number is the only of the warning and indicating segments 16,18,20 that is illuminated or caused to flash.

If the number 0 or 1 is retrieved, the parameter is considered to be below the low warning value, and if the number 11 or 12, the parameter is considered to be above the high warning value.

In keeping with the above example, suppose that the scaled data received from the instrument and associated with the oil pressure in an engine is 179 and that the oil pressure is to be displayed in the low warning format. The instrument would retrieve for example 100 kPa for the parameter value and would then go to a second look-up table to retrieve for example the number 6 from the look-up table and segments 2 through 6 would be illuminated if in the fill-the-graph mode.

The instrument 10 also reads 48 the display mode identifier from the identification line connected to the mode select means 32 and responsively determines whether the parameters should be displayed in the fill-the-graph mode or the single-bar mode. In the preferred embodiment, the fill-the-graph mode is indicated when the display mode identifier is in an open or floating voltage condition and the single-bar mode is indicated when the display mode identifier is at a ground potential.

If the gauge includes a plurality of symbols 26, the instrument 10 produces a control signal to illuminate one of the symbols 26 in response to a symbol identifier that is retrieved from the memory device (not shown). In the preferred embodiment, the gauge includes two symbols and the symbol identifier indicates which of the two symbols 26 should be illuminated in response to the parameter assigned to that gauge. Since the parameter assignment is made in response to the identification code, the symbol identifier is also advantageously retrieved in response to the identification code.

If the display mode identifier is at an open or floating voltage condition and thus in the fill-the-graph mode, the instrument determines whether the gauge is a high or low warning style gauge in response to the gauge style identifier described above. If the gauge is a low warning style gauge, the gauge either illuminates or flashes the appropriate portions of the gauge in response to the retrieved segment number determined as described above. Similarly, if the gauge is a high warning style gauge, the instrument 10 either illuminates or flashes the appropriate portions of the gauge in response to the retrieved segment number determined as described above.

If the display mode identifier is at a ground potential and thus in the single-bar mode, the instrument 10 determines whether the gauge is a high or low warning style gauge in response to the gauge style identifier described above. If the gauge is a low warning style gauge, the gauge either illuminates or flashes the appropriate portions of the gauge in response to the retrieved segment number determined as described above. Similarly, if the gauge is a high warning style gauge, the instrument 10 either illuminates or flashes the appropriate portions of the gauge in response to the retrieved segment number determined as described above.

In response to the switch-type inputs, the electronic control 20 determines whether and which indicator lights 14 should be illuminated in a manner well-known in the art. For example, if the data message associated with a particular switch-type input indicates that the switch-type sensor has been activated in response to a fault condition, warning condition, or the like, the indicator light 14 associated with that sensor is illuminated.

INDUSTRIAL APPLICABILITY

The operation of an embodiment of the present invention is best described in relation to its use in monitoring one of a plurality of parameters on a vehicle. An instrument advantageously has six circular gauges. Four of the six gauges allow the option of displaying one from a choice of two parameters. The parameter being displayed by each gauge is identified by an ISO symbol near the center of the gauge. Gauge usage, the parameter displayed, and the ISO symbol identifying the displayed parameter are defined in software and are vehicle dependent.

In response to an identification code being received via the wire harness, the instrument 10 assigns each of the sensed parameters to a gauge 12. The gauges each include indicating segments forming the middle portion of the gauge with two warning segments at both the top and bottom of the gauge. For each gauge, the high warning segments are enabled if the instrument assigns a parameter to that gauge for which it is desirable to indicate a warning condition when the parameter exceeds a certain level; whereas the low warning segments are enabled if the instrument assign a parameter for which it is desirable to indicate a warning condition when the parameter is below a certain level.

The instrument 10 is programmed so that a normal operating level for each gauge on a given vehicle is close to the center of the gauge. For this reason the scaling for each gauge is both parameter and vehicle dependent.

In addition, the appearance, or display mode, of the gauges 12 may be changed by changing the status of the display mode select means 32. In the fill-the-graph mode, the parameter level is reflected by the number of gauge segments that are turned on. In this mode, the gauge appears like a bar graph. In the single-bar mode, the gauge appears more like a mechanical gauge with only one segment at a time being turned on.

In the fill-the-graph mode if a parameter having a high warning value exceeds that level, the indicating segments 16 and one or both of the high warning segments 18 are caused to flash depending on the degree to which the parameter exceeds the high warning value. If a parameter having a low warning value is below that level, one or both of the low warning segments 20 are caused to flash depending on the degree to which the parameter level is below the low warning value.

In the single-bar mode, as the gauge data increases the single segment that is on will turn off and the next segment to the right will be turned on such that only a single segment is illuminated while the level of the sensed parameter is within the normal operating range. If the parameter level exceeds the high or low warning value, only one of the high or low warning segments flash.

Any specific values used in the above descriptions should be viewed as exemplary only and not as limitations. Other aspects, objects, and advantages of this invention can be obtained from a study of the drawings, the disclosure, and the appended claims.

We claim:

1. An apparatus for indicating the level of one of a plurality of sensed parameters on one of a plurality of machines, said sensed parameter having a normal operating range, comprising:

an identification means for producing an identification code;

a plurality of indicating segment means being selectively illuminable for indicating the levels of the sensed parameter in the normal operating range;

a high warning segment means being selectively illuminable for indicating the level of the sensed parameter being above the normal operating range;

a low warning segment means being selectively illuminable for indicating the level of the sensed parameter being below the normal operating range; and selection means for receiving said identification code and responsively enabling one of said high and low warning segment means.

2. An apparatus, as set forth in claim 1, including a high and a low outline segment means being illuminable for indicating high and low ranges of the sensed parameter, respectively, and wherein said selection means illuminates one of said high and low outline segment means in response to said identification code.

3. An apparatus, as set forth in claim 1, including a mode select means for producing a display mode identifier and means for selecting one of a plurality of display modes in response to said display mode identifier.

4. An apparatus, as set forth in claim 3, wherein said display modes include a single-bar mode and a fill-the-graph mode.

5. An apparatus for indicating the level of one of a plurality of sensed parameters on one of a plurality of machines, said sensed parameter having a normal operating range, comprising:

an identification means for producing an identification code;

a plurality of indicating segment means being selectively illuminable for indicating the levels of the sensed parameter in the normal operating range;

a plurality of symbol means for indicating the identity of the sensed parameter, said symbol means being selectively illuminable;

a high warning segment means being selectively illuminable for indicating the level of the sensed parameter being above the normal operating range;

a low warning segment means being selectively illuminable for indicating the level of the sensed parameter being below the normal operating range; and selection means for receiving said identification code and responsively enabling one of said high and low warning segment means and illuminating one of said plurality of symbol means.

6. An apparatus, as set forth in claim 5, including a mode select means for producing a display mode identifier and means for selecting one of a plurality of display modes in response to said display mode identifier; said display modes including a single-bar mode and a fill-the-graph mode.

7. An apparatus, as set forth in claim 5, including a high and a low outline segment means being illuminable for indicating a range of levels of the sensed parameter being above and below the normal operating range, respectively, and wherein said selection means illuminates one of said high and low outline segment means in response to said identification code.

8. An apparatus, as set forth in claim 5, wherein said indicating segment means and said high warning segment means flash in response to the level of the sensed parameter being above the normal operating range and the low warning segment means being enabled, and said indicating segment means and said low warning segment means flash in response to the level of the sensed parameter being below the normal operating range and the low warning segment means being enabled.

9. A method for indicating the level of one of a plurality of sensed parameters on one of a plurality of machines, said sensed parameter having a normal operating range, comprising the steps of:

producing an identification code; and receiving said identification code and responsively enabling one of a high warning segment for indicating the level of the sensed parameter being above the normal operating range and a low warning segment for indicating the level of the sensed. parameter being below the normal operating range.

10. A method, as set forth in claim 9, including the step of illuminating one of a high and a low outline segment and one of a plurality of symbols in response to the identification code.

11. A method, as set forth in claim 9, including the step of selecting one of a single-bar mode and a fill-the-graph mode in response to a display mode identifier.

* * * * *